(12) United States Patent
Huang et al.

(10) Patent No.: US 10,003,614 B2
(45) Date of Patent: Jun. 19, 2018

(54) METHOD, DEVICE, AND STORAGE MEDIUM FOR DEEP PACKET INSPECTION CONTROL

(71) Applicant: ZTE Corporation, Shenzhen, Guangdong (CN)

(72) Inventors: Sunliang Huang, Shenzhen (CN); Jun Feng, Shenzhen (CN); Liang Fan, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 31 days.

(21) Appl. No.: 15/023,712

(22) PCT Filed: Jun. 23, 2014

(86) PCT No.: PCT/CN2014/080552
§ 371 (c)(1),
(2) Date: Mar. 22, 2016

(87) PCT Pub. No.: WO2015/039474
PCT Pub. Date: Mar. 26, 2015

(65) Prior Publication Data
US 2016/0219080 A1    Jul. 28, 2016

(30) Foreign Application Priority Data

Sep. 23, 2013    (CN) .......................... 2013 1 0437064

(51) Int. Cl.
*H04L 29/06*    (2006.01)
*H04L 12/24*    (2006.01)
*H04W 24/02*    (2009.01)

(52) U.S. Cl.
CPC .......... *H04L 63/20* (2013.01); *H04L 41/0893* (2013.01); *H04W 24/02* (2013.01)

(58) Field of Classification Search
CPC ........................... H04L 12/14–12/1407; H04L 41/0893–41/0896;
(Continued)

(56) References Cited

U.S. PATENT DOCUMENTS

| 8,443,440 B2 | 5/2013 | McGee | |
| 2009/0150972 A1* | 6/2009 | Moon | .................. H04L 63/102 726/1 |

(Continued)

FOREIGN PATENT DOCUMENTS

| CA | 2661398 A1 | 10/2009 |
| CN | 101505236 A | 8/2009 |

(Continued)

OTHER PUBLICATIONS

International Search Report in international application No. PCT/CN2014/080552, dated Sep. 24, 2014, 2 pgs.
English Translation of the Written Opinion of the International Search Authority in international application No. PCT/CN2014/080552, dated Sep. 24, 2014, 6 pgs.

(Continued)

*Primary Examiner* — Kevin Bechtel
(74) *Attorney, Agent, or Firm* — Cooper Legal Group, LLC

(57) ABSTRACT

The present disclosure discloses a Deep Packet Inspection (DPI) control method and device, and a storage medium. The method includes that: a traffic collection request is sent to a network controller according to a pre-set collection policy, wherein the traffic collection request is used for allowing the network controller to send a request for traffic collection to one or more corresponding network devices; traffic data collected by the one or more network devices are received (S11); and the received traffic data of the one or more network devices are analyzed and processed to generate a network control policy corresponding to each network device, and the network control policies are sent to the network controller correspondingly to allow the network (Continued)

controller to send each network control policy to the corresponding network device.

11 Claims, 2 Drawing Sheets

(58) Field of Classification Search
CPC .. H04L 41/5019–41/5025; H04L 47/10; H04L 47/20; H04L 47/2475; H04L 47/25; H04L 47/805; H04L 47/822; H04L 63/08; H04L 63/10; H04L 63/20–63/205; H04W 24/02
See application file for complete search history.

(56) References Cited

U.S. PATENT DOCUMENTS

| | | | |
|---|---|---|---|
| 2009/0254990 A1 | 10/2009 | McGee | |
| 2010/0070614 A1* | 3/2010 | Keum | G06F 15/163 709/219 |
| 2013/0227685 A1 | 8/2013 | McGee | |
| 2013/0250770 A1* | 9/2013 | Zou | H04L 47/19 370/238 |
| 2014/0241156 A1* | 8/2014 | Cha | H04L 43/0876 370/230 |
| 2016/0234121 A1 | 8/2016 | Zou et al. | |

FOREIGN PATENT DOCUMENTS

| | | |
|---|---|---|
| CN | 101789904 A | 7/2010 |
| CN | 101997700 A | 3/2011 |
| CN | 102045363 A | 5/2011 |
| CN | 102142925 A | 8/2011 |
| CN | 102420701 A | 4/2012 |
| CN | 102946500 A | 2/2013 |
| EP | 2829039 A1 | 1/2015 |
| WO | 2009089701 A1 | 7/2009 |
| WO | 2013129804 A1 | 9/2013 |
| WO | 2013139298 A1 | 9/2013 |

OTHER PUBLICATIONS

International Search Report in international application No. PCT/CN2014/080552, dated Sep. 24, 2014, 6 pgs.
Written Opinion of the International Search Authority in international application No. PCT/CN2014/080552, dated Sep. 24, 2014, 10 pgs.
Xie Huawei & USTC T Tsou Huawei (USA) D Lopez Telefonica I+D H Yin Huawei (USA) H: "Use Cases for ALTO with Software Defined Networks;draft-xie-alto-sdn-extension-use-cases-01. txt", Use Cases for ALTO With Software Defined Networks;draft-xie-alto-sdn-wxtension-use-cases-01. txt, Internet Engineering Task Force,IETF; Standardworkingdraft, Internet Society (ISOC) 4, (Jan. 9, 2013), pp. 1-29, XP015089409,[retrieved on Jan. 9, 2013],mailed on Jan. 9, 2013, 20 pgs.
Foster N et al: "Languages for software-defined networks",IEEE Communications Magazine, IEEE Service Center, Piscataway, US, vol. 51, No. 2, Feb. 1, 2013 (Feb. 1, 2013), pp. 128-134, XP011505038, ISSN: 0163-6804, DOI:10.1109/MCM.2013. 6461197,mailed on Feb. 1, 2013.
Kok-Kiong Yap Te-Yuan Huang Ben Dodson Monica S Lam Nick McKeown Stanford University {Yapkke et al: "Towards Software-Friendly Networks",USENIX,,Aug. 25, 2010 (Aug. 25, 2010), pp. 1-5, XP061013198,[retrieved on Aug. 25, 2010],mailed on Aug. 25, 2010.
Andrew D Ferguson et al: "Participatory networking",SIGCOMM, ACM, 2 Penn Plaza, Suite 701 New York NY 10121-0701 USA,Aug. 27, 2013 (Aug. 27, 2013), pp. 327-338, XP058030620, DOI:10.1145/2486001.2486003 ISBN: 978-1-4503-2056-6,mailed on Aug. 27, 2013.
Big Switch Networks:"The Open SDN Architecture ", Jul. 31, 2013 (Jul. 31, 2013), XP055296004, Retrieved from the Internet:URL:https://www.bigswitch.com/sites/default/files/sdn_overview.pdf [retrieved on Aug. 17, 2016],mailed on Aug. 17, 2016, 4 pgs.
Supplementary European Search Report in European application No. 14845484.6, dated Aug. 26, 2016, 11 pgs.

* cited by examiner

METHOD, DEVICE, AND STORAGE MEDIUM FOR DEEP PACKET INSPECTION CONTROL

TECHNICAL FIELD

The present disclosure relates to communications and more particularly to a method, a device, and a storage medium for Deep Packet Inspection (DPI) control.

BACKGROUND

With the rapid development of the Internet, Internet services emerge continuously. In terms of a service type, the services include voices, texts, videos or the like. In terms of a network link mode of a service, the services include services of a Client/Server (C/S) type, a Browser/Server (B/S) type, a Peer to Peer (P2P) type, a Peer to Server & Peer (P2SP) type and other types. In terms of a service interaction mode, the services include static web pages, interactive web pages, instant communications or the like. Implementation protocols for different services are very different.

The emergence of a great number of services provides rich Internet service for users and also brings difficulties in supervision and control. In order to meet requirements for national network safety monitoring and refined operation of telecom operators, a Deep Packet Inspection (DPI) technology emerges. The DPI technology can be applied to traffic management, safety, network analysis and other aspects, and can be used to analyse a network data packet.

Most of conventional DPI devices acquire packets using port mirroring or an optical splitter. After perceptual analysis is performed, a corresponding control policy is formed, and is directly transmitted to a corresponding network device to carry out network control. In this way, there is lack of uniform control over the whole network. The transmission and execution of the control policy are only limited to end-to-end control and thus one end-to-multiple ends control is difficult to realize, which is limited for an application range of the DPI devices.

SUMMARY

The embodiments of the present disclosure provide a method, a device, and a storage medium for DPI control, which are intended to realize data collection and transmission of a control policy for one end-to-multiple ends.

In a first aspect, an embodiment of the present disclosure provides a method for DPI control including:

a traffic collection request is sent to a network controller according to a pre-set collection policy, wherein the traffic collection request is used for allowing the network controller to send a request for traffic collection to one or more network devices;

traffic data collected by the one or more network devices are received; and the received traffic data from the one or more network devices are analysed and processed to generate each of network control policies corresponding to each of the network devices, and the network control policies are sent to the network controller to allow the network controller to send each of the network control policies to a corresponding network device.

Preferably, after the network control policies are sent to the network controller, the method may further include that:

each of feedback messages reported by the network controller is received, wherein the feedback messages are used for indicating that the network devices have successfully executed the network control policies.

Preferably, the step that the traffic collection request is sent to the network controller according to the pre-set collection policy may include that:

the traffic collection request is sent to the network controller via a network capacity control device according to the pre-set collection policy, wherein the traffic collection request is used for allowing the network controller to send the request for traffic collection to the one or more network devices.

Preferably, the step that the network control policies are sent to the network controller may include that:

the network control policies are sent to the network controller via the network capacity control device to allow the network controller to send each of the received network control policies to the corresponding network device.

In a second aspect, an embodiment of the present disclosure also provides a device for DPI control, including a traffic collection module, a receiving module, a generation module and a control policy sending module, wherein the traffic collection module is configured to send a traffic collection request to a network controller according to a pre-set collection policy, the traffic collection request being used for allowing the network controller to send a request for traffic collection to one or more network devices;

the receiving module is configured to receive traffic data collected by the one or more network devices;

the generation module is configured to analyze and process the received traffic data from the one or more network devices to generate each of network control policies corresponding to each of the network devices; and the control policy sending module is configured to send the network control policies to the network controller to allow the network controller to send each of the network control policies to a corresponding network device.

Preferably, the receiving module may be further configured to receive each of feedback messages reported by the network controller, wherein the feedback messages are used for indicating that the network devices have successfully executed the network control policies.

Preferably, the traffic collection module may be further configured to send the traffic collection request to the network controller via a network capacity control device according to the pre-set collection policy, wherein the traffic collection request is used for allowing the network controller to send the request for traffic collection to the one or more network devices.

Preferably, the control policy sending module may be further configured to send the network control policies to the network controller via the network capacity control device to allow the network controller to send each of the received network control policies to the corresponding network device.

In a third aspect, an embodiment of the present disclosure provides a readable storage medium, wherein executable instructions are stored therein and are used for executing the abovementioned method for DPI control.

According to the method, the device and the storage medium for DPI control in the embodiments of the present disclosure, the network controller interacts with each of the network devices, and thus the traffic collection request and the network control policy are sent to each of the network devices. Therefore, data collection and transmission of the control policy for one end-to-multiple ends are realized.

The objectives, functional characteristics and advantages of the present disclosure will be further described with reference to the embodiments and the accompanying drawings.

DETAILED DESCRIPTION

It should be understood that the embodiments described herein are only intended to explain the present disclosure and are not intended to limit the present disclosure.

Figure 1:
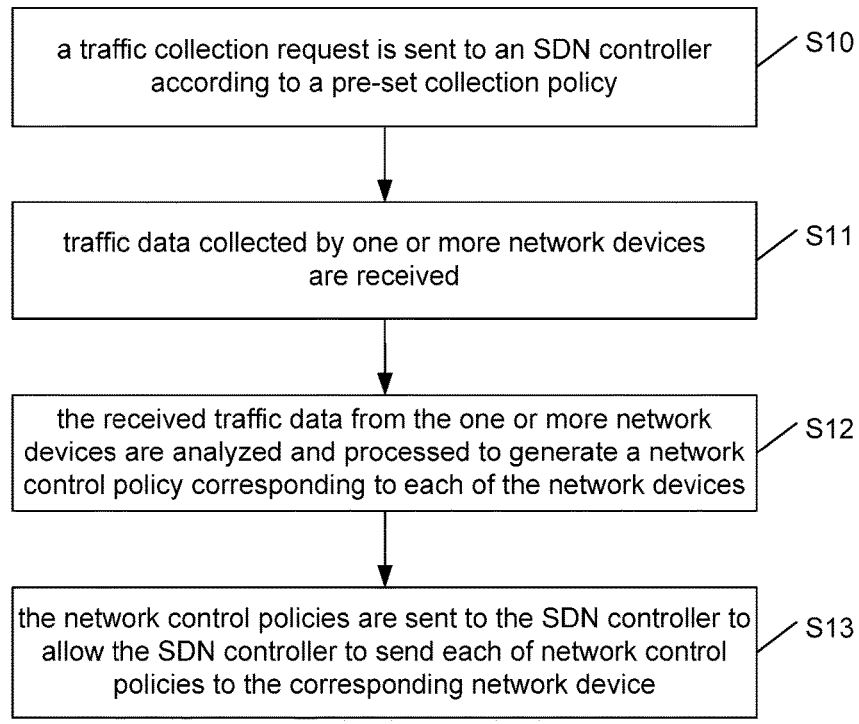
FIG. 1 is a flowchart illustrating a method for DPI control according to a first embodiment of the present disclosure.

In this embodiment, a Software Defined Network (SDN) controller is taken as an example to describe the network controller. In other embodiments of the present disclosure, any one of applicable controller at a network side is also used. FIG. 1 is a flowchart illustrating a method for DPI control according to a first embodiment of the present disclosure. As shown in FIG. 1, the method includes the following steps.

At S10, a traffic collection request is sent to an SDN controller according to a pre-set collection policy.

Here, the traffic collection request is used for allowing the network controller to send a request for traffic collection to one or more corresponding network devices.

Here, the traffic collection request is sent to the network controller according to the pre-set collection policy to allow the network controller to send the traffic collection request to one or more network devices in response to the traffic collection request.

In Step S10, the traffic collection request is sent to the SDN controller according to the pre-set collection policy. The traffic collection request contains some parameters for assigning contents to be collected, such as service flows from regular users, interconnection Internet Protocol (IP) flows between regular networks and traffics from regular ports. After the SDN controller receives the traffic collection request, the SDN controller parses and processes the same to determine one or more network devices which need the traffic collection request. The traffic collection request is converted into an instruction capable of being transmitted via a southbound interface of the SDN controller, and the converted traffic collection request is further sent to the one or more network devices via the southbound interface of the SDN controller.

The SDN controller adopts a uniform control mode, and all of the network devices can be globally managed and controlled.

At S11, traffic data collected by the one or more network devices are received.

In Step S11, the traffic data collected by each of the network devices are received. Each of the network devices performs traffic collection according to the traffic collection request transmitted by the SDN controller, and returns the collected traffic data. Preferably, in the method for DPI control, the traffic data collected from the network devices are directly received without the need of the SDN controller.

At S12, the received traffic data from the one or more network devices are analyzed and processed to generate a network control policy corresponding to each of the network devices.

In Step S12, the received traffic data are analyzed and processed to generate the corresponding network control policies. If the received traffic data of a network device A are analyzed and processed to determine that the traffic of a regular port of the network device A is too much, a network control policy for restricting traffic is generated for the network device A.

At S13, the network control policies are sent to the SDN controller to allow the SDN controller to send each of the network control policies to the corresponding network device.

In Step S13, each of the network control policies is sent to the SDN controller. After the SDN controller receives the network control policies, parsing and processing are performed to determine one or more network devices which need the network control policies. Each of the network control policies is converted into an instruction capable of being transmitted via the southbound interface of the SDN controller, and the converted network control policy is further sent to the corresponding network device via the southbound interface of the SDN controller.

By means of the embodiment, the SDN controller interacts with each of the network devices, the traffic collection request and the network control policy are sent to each of the network devices, and therefore the data collection and transmission of the control policy for one end-to-multiple ends are realized.

Furthermore, after Step S13, the method further includes the following step.

At S14, each of feedback messages reported by the SDN controller is received, each of feedback messages being used for indicating that the corresponding network device has successfully executed the corresponding network control policy.

After each of the network devices receives the corresponding network control policy transmitted by the SDN controller, a relevant network control policy is deployed on this network device, and a feedback message indicating that the network control policy is successfully executed is sent to the SDN controller after the deployment is completed. The SDN controller collects the feedback messages which are fed back by all of the network devices and indicate that the network control policies are successfully executed, performs uniform processing, and then returns the uniformly-processed feedback messages indicating that the network control policies are successfully executed.

Furthermore, before Step S11, the method further includes the following step.

At S15, the feedback messages which are reported by the SDN controller and indicate that the collection policies of the one or more network devices are successfully executed are received.

After the one or more network devices receive the traffic collection request transmitted by the SDN controller, a relevant traffic collection policy is deployed on each of the network devices, and each of feedback messages indicating that the corresponding collection policy is successfully executed is sent to the SDN controller after the deployment is completed. The SDN controller collects the feedback messages which are sent by all of the network devices and indicate that the collection policies are successfully executed, performs uniform processing, and then returns the uniformly-processed feedback messages indicating that the collection policies are successfully executed.

Figure 2:
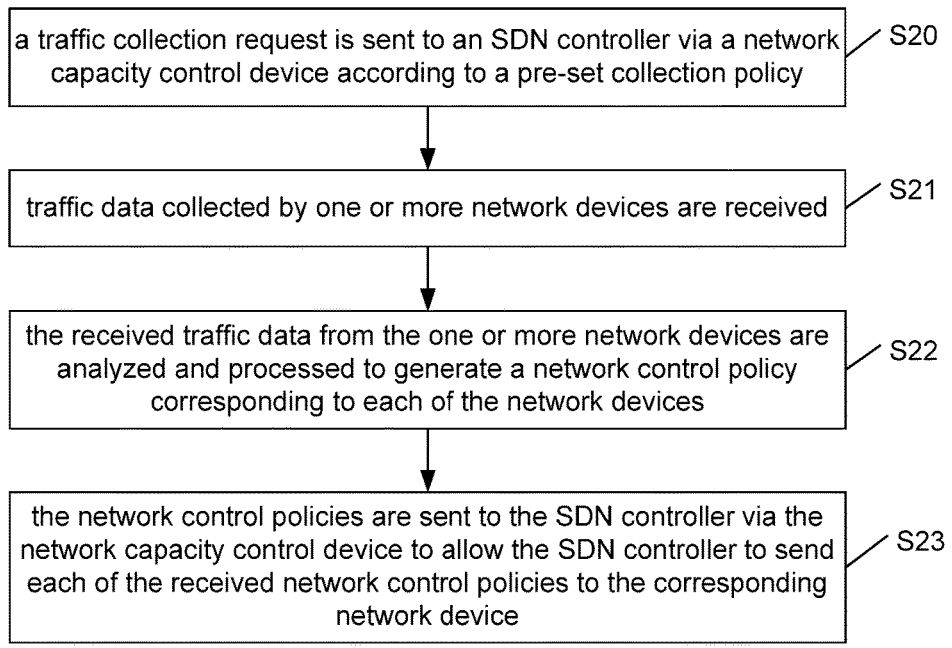
FIG. 2 is a flowchart illustrating a method for DPI control according to a second embodiment of the present disclosure.

In this embodiment, the SDN controller is taken as an example to describe the network controller. In the other embodiments of the present disclosure, any one of applicable controller at the network side is applicable. FIG. 2 is a flowchart illustrating a method for DPI control according to a second embodiment of the present disclosure. As shown in FIG. 2, the method includes the following steps.

At S20, a traffic collection request is sent to an SDN controller via a network capacity control device according to a pre-set collection policy.

Here, the traffic collection request is sent to the SDN controller via the network capacity control device according to the pre-set collection policy to allow the SDN controller to send the traffic collection request to one or more network devices according to the received traffic collection request.

In Step S20, the traffic collection request is sent to the network capacity control device according to the pre-set collection policy. The traffic collection request focuses on describing the application layer requirements, and the level of abstraction is relatively high. The traffic collection request contains some parameters for assigning contents to be collected, such as specific service flows of specific users, specific IP flows and traffics of specific ports. After the network capacity control device receives the traffic collection request, parsing and processing are performed to form a traffic collection request which can be recognized by the SDN controller, and the traffic collection request which is parsed and processed is transmitted to the SDN controller via a northbound interface of the SDN controller.

After the SDN controller receives the traffic collection request transmitted by the network capacity control device, parsing and processing are performed to determine one or more network devices which need the traffic collection request, the traffic collection request is converted into an instruction capable of being transmitted via the southbound interface of the SDN controller, and the converted traffic collection request is further sent to the one or more network devices via the southbound interface of the SDN controller.

The SDN controller adopts a uniform control mode, and all of the network devices can be globally managed and controlled.

At S21, traffic data collected by the one or more network devices are received.

In Step S21, the traffic data collected by each of the network devices are received. Each of the network devices performs traffic collection according to the traffic collection request transmitted by the SDN controller, and returns the collected traffic data. Preferably, in the method for DPI control, the traffic data collected from the network devices are directly received without the need of the SDN controller and the network capacity control device.

At S22, the received traffic data from the one or more network devices are analyzed and processed to generate a network control policy corresponding to each of the network devices.

In Step S22, the received traffic data are analyzed and processed to generate the corresponding network control policies. The network control policies focus on describing the application layer requirements, such as diamond-level service guarantee and end-to-end service guarantee, and the level of abstraction is relatively high. For example, P2P traffic data of a specific region, received from a network device A, are analyzed. If it is determined that the P2P traffic data of the current specific region of the network device A are over-sized, a network control policy for restricting the traffic is generated.

At S23, the network control policies are sent to the SDN controller via the network capacity control device correspondingly to allow the SDN controller to send each of the received network control policies to the corresponding network device.

In Step S23, each of the generated network control policies is sent to the network capacity control device. After the network control policies are received, parsing and processing are performed, the received network control policies are converted into network control policies which can be recognized by the SDN controller, and the converted network control policies are transmitted to the SDN controller via a northbound interface of the SDN controller.

After the SDN controller receives the network control policies transmitted by the network capacity control device, parsing and processing are performed to determine one or more network devices which need the network control policies, each of the network control policies is converted into an instruction capable of being transmitted via the southbound interface of the SDN controller, and each of the converted network control policies is further sent to the corresponding network device via the southbound interface of the SDN controller.

Furthermore, after Step S23, the method further includes the following step.

At S24, each of feedback messages reported by the SDN controller via the network capacity control device is received, each of the feedback messages being used for indicating that the corresponding network device has successfully executed the corresponding network control policy.

After each of the network devices receives the corresponding network control policy transmitted by the SDN controller, a relevant network control policy is deployed on this network device, and each of the feedback messages indicating that the network control policy is successfully executed is sent to the SDN controller after the deployment is completed. The SDN controller collects the feedback messages which are fed back by all of the network devices and indicate that the network control policies are successfully executed, performs uniform processing, and then sends the uniformly-processed feedback messages indicating that the network control policies are successfully executed to the network capacity control device. The network capacity control device returns the feedback messages.

Furthermore, before Step S21, the method further includes the following step.

At S25, the feedback messages which are reported by the SDN controller via the network capacity control device and indicate that the collection policies of the one or more network devices are successfully executed are received.

After the one or more network devices receive the traffic collection request transmitted by the SDN controller, a relevant traffic collection policy is deployed on this network device, and each of the feedback messages indicating that the collection policy is successfully executed is sent to the SDN controller after the deployment is completed. The SDN controller collects the feedback messages which are sent by all of the network devices and indicate that the collection policies are successfully executed, performs uniform processing, and then sends the uniformly-processed feedback messages indicating that the collection policies are successfully executed to the network capacity control device. The network capacity control device returns the feedback messages.

Figure 3:
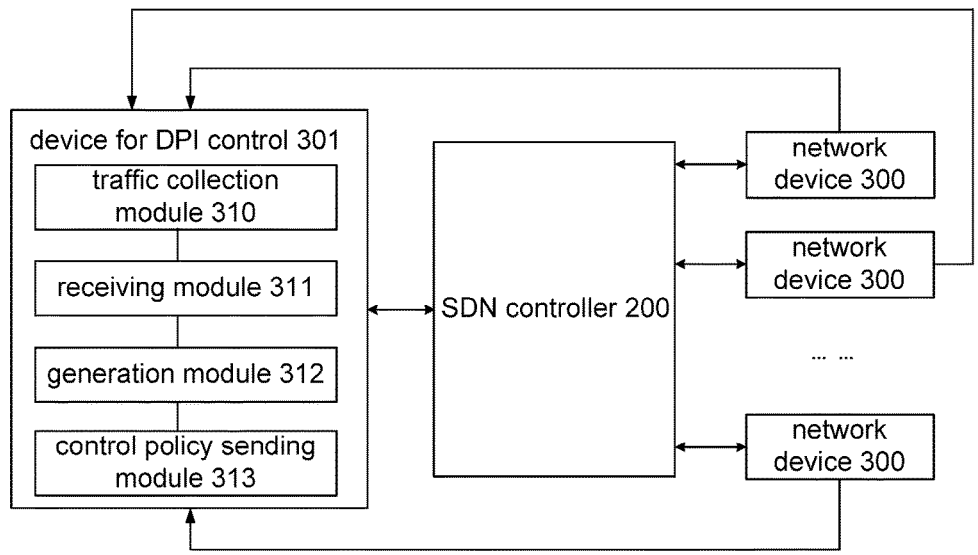
FIG. 3 is a structure block diagram showing a device for DPI control according to a first embodiment of the present disclosure.

In this embodiment, the SDN controller is taken as an example to describe. In the other embodiments of the present disclosure, any one of applicable network controllers may be used. FIG. 3 is a structure block diagram showing a device for DPI control according to a first embodiment of the present disclosure. As shown in FIG. 3, the device 301 includes a traffic collection module 310, a receiving module 311, a generation module 312 and a control policy sending module 313.

The traffic collection module 310 is configured to send a traffic collection request to an SDN controller 200 according to a pre-set collection policy, the traffic collection request being used for allowing the SDN controller 200 to send a request for traffic collection to one or more network devices 300.

The receiving module 311 is configured to receive traffic data collected by the one or more network devices 300.

The generation module 312 is configured to analyze and process the received traffic data from the one or more network devices to generate a network control policy corresponding to each of the network devices.

The control policy sending module 313 is configured to send the network control policies to the SDN controller 200 to allow the SDN controller 200 to send each of the network control policies to the corresponding network device 300.

The traffic collection module 310 sends the traffic collection request to the SDN controller 200 according to the pre-set collection policy. The traffic collection request contains some parameters for assigning contents to be collected, such as service flows from regular users, regular IP flows and traffics from regular ports. After the SDN controller 200 receives the traffic collection request, parsing and processing are performed to determine one or more network devices 300 which need the traffic collection request. The traffic collection request is converted into an instruction capable of being transmitted via a southbound interface of the SDN controller 200, and the converted traffic collection request is further sent to the one or more network devices via the southbound interface of the SDN controller 200. The SDN controller 200 adopts a uniform control mode, and all of the network devices 300 can be globally managed and controlled.

The receiving module 311 receives traffic data collected from each of the network devices 300. Each of the network devices 300 performs traffic collection according to the traffic collection request transmitted by the SDN controller 200, and sends the collected traffic data to the device for DPI control 301. The traffic data collected from each of the network devices 300 are directly received via the receiving module 311 without the need of the SDN controller 200.

The generation module 312 analyzes and processes the received traffic data to generate the network control policies. If the received traffic data of a network device A are analyzed and processed to determine that the traffic from a regular port of the network device A is too much, a network control policy for restricting traffic is generated for the network device A.

The control policy sending module 313 sends each of the generated network control policies to the SDN controller 200. After the SDN controller 200 receives the network control policies, parsing and processing are performed to determine one or more network devices 300 which need the network control policies. Each of the network control policies is converted into an instruction capable of being transmitted via the southbound interface of the SDN controller 200, and the converted network control policy is further sent to the corresponding network device 300 via the southbound interface of the SDN controller 200.

Furthermore, the receiving module 311 is further configured to receive each of feedback messages reported by the SDN controller 200, each of the feedback messages being used for indicating that the corresponding network device has successfully executed the corresponding network control policy.

After each of the network devices receives the corresponding network control policy transmitted by the SDN controller 200, a relevant network control policy is deployed on this network device, and each of the feedback messages indicating that the network control policy is successfully executed is sent to the SDN controller 200 after the deployment is completed. The SDN controller 200 collects the feedback messages which are fed back by all of the network devices and indicate that the network control policies are successfully executed, performs uniform processing, and then sends the uniformly-processed feedback messages indicating that the network control policies are successfully executed to the receiving module 311 of the device for DPI control 301.

Furthermore, the receiving module 311 is further configured to receive the feedback messages which are reported by the SDN controller 200 and indicate that the collection policies of the one or more network devices are successfully executed.

After each of the one or more network devices receives the traffic collection request transmitted by the SDN controller 200, a relevant traffic collection policy is deployed on this network device, and each of feedback messages indicating that the collection policy is successfully executed is sent to the SDN controller 200 after the deployment is completed. The SDN controller 200 collects the feedback messages which are sent by all of the network devices and indicate that the collection policies are successfully executed, performs uniform processing, and then sends the uniformly-processed feedback messages indicating that the collection policies are successfully executed to the receiving module 311 of the device for DPI control 301.

Figure 4:
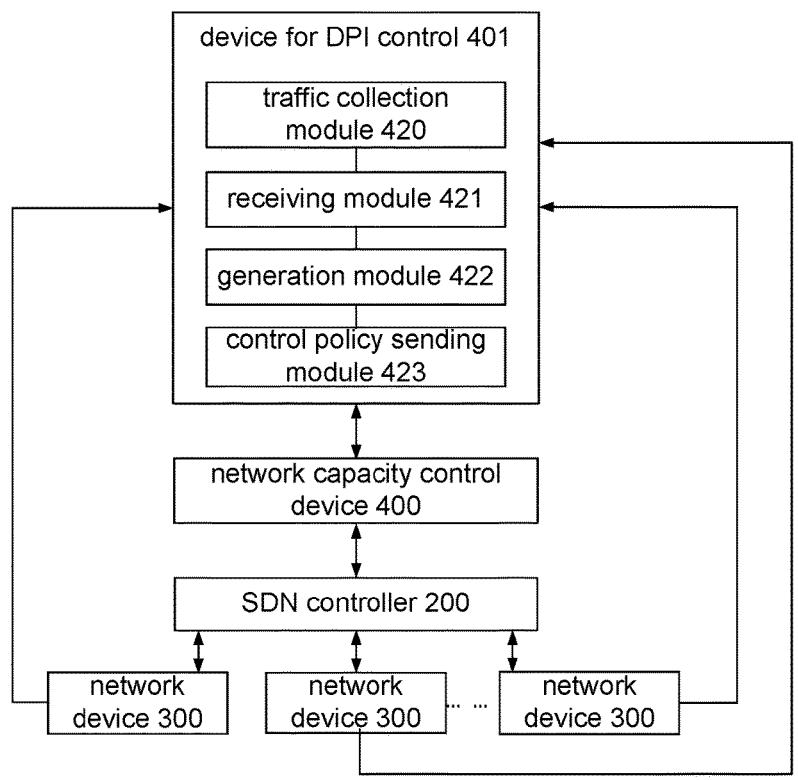
FIG. 4 is a structure block diagram showing a device for DPI control according to a second embodiment of the present disclosure.

In this embodiment, the SDN controller is taken as an example to describe. In the other embodiments of the present disclosure, any one of applicable network controllers is also used. FIG. 4 is a structure block diagram showing a device for DPI control according to a second embodiment of the present disclosure. As shown in FIG. 4, the device 401 includes a traffic collection module 420, a receiving module 421, a generation module 422 and a control policy sending module 423.

The traffic collection module 420 is configured to send a traffic collection request to an SDN controller 200 via a network capacity control device 400 according to a pre-set collection policy, the traffic collection request being used for allowing the SDN controller 200 to send a request for traffic collection to one or more corresponding network devices.

The receiving module 421 is configured to receive traffic data collected by the one or more network devices 300.

The generation module 422 is configured to analyze and process the received traffic data of each of the one or more network devices 300 to generate a network control policy corresponding to each of the network devices.

The control policy sending module 423 is configured to send all of the generated network control policies to the SDN controller 200 via the network capacity control device 400 to allow the SDN controller to send each of the received network control policies to the corresponding network device.

The traffic collection module 420 sends the traffic collection request to the network capacity control device 400 according to the pre-set collection policy. The traffic collection request focuses on describing application layer requirements, and the level of abstraction is relatively high. The traffic collection request contains some parameters for assigning contents to be collected, such as specific service flows from specific users, specific IP flows and traffics from specific ports. After the network capacity control device 400 receives the traffic collection request, parsing and processing are performed to form a traffic collection request which can be recognized by the SDN controller 200, and the parsed and processed traffic collection request is transmitted to the SDN controller 200 via a northbound interface of the SDN controller 200.

After the SDN controller 200 receives the traffic collection request transmitted by the network capacity control device 400, parsing and processing are performed to determine one or more network devices which need the traffic collection request, the traffic collection request is converted into an instruction capable of being transmitted via the southbound interface of the SDN controller 200, and the converted traffic collection request is further sent to the one or more network devices via the southbound interface of the SDN controller 200. The SDN controller adopts a uniform control mode, and all of the network devices can be globally managed and controlled.

The receiving module 421 receives the traffic data collected by each of the network devices 300. Each of the network devices 300 performs traffic collection according to the traffic collection request transmitted by the SDN controller 200, and sends the collected traffic data to the receiving module 421 of the device for DPI control 401. The traffic data collected from each of the network devices 300 are directly received via the receiving module 421 without the need of the SDN controller 200 and the network capacity control device 400.

The generation module 422 analyzes and processes the received traffic data to generate the network control policies. The network control policies focus on describing application layer requirements such as diamond-level service guarantee and end-to-end service guarantee, and the level of abstraction is relatively high. For example, P2P traffic data from a specific region, received from a network device A, are analysed. If it is determined that the P2P traffic data from the current specific region of the network device A are oversized, a network control policy for restricting traffic is generated.

The control policy sending module 423 sends each of the generated network control policies to the network capacity control device 400. After the network capacity control device 400 receives the network control policies, parsing and processing are performed, the received network control policies are converted into network control policies which can be recognized by the SDN controller 200, and the converted network control policies are transmitted to the SDN controller 200 via a northbound interface of the SDN controller 200.

After the SDN controller 200 receives the network control policies transmitted by the network capacity control device 400, parsing and processing are performed to determine one or more network devices which need the network control policies, each of the network control policies is converted into an instruction capable of being transmitted via the southbound interface of the SDN controller 200, and each of the converted network control policies is further sent to the corresponding network device 300 via the southbound interface of the SDN controller 200.

Furthermore, the receiving module 421 is further configured to receive each of feedback messages reported by the SDN controller 200 via the network capacity control device 400, each of the feedback messages being used for indicating that the corresponding network device 300 has successfully executed the corresponding network control policy.

After each of the network devices 300 receives the corresponding network control policy transmitted by the SDN controller 200, a relevant network control policy is deployed on the network device 300, and a feedback message indicating that the network control policy is successfully executed is sent to the SDN controller 200 after the deployment is completed. The SDN controller 200 collects the feedback messages which are fed back by all of the network devices 300 and indicate that the network control policies are successfully executed, performs uniform processing, and then sends the uniformly-processed feedback messages indicating that the network control policies are successfully executed to the network capacity control device 400. The network capacity control device 400 sends the feedback messages to the receiving module 421 of the device for DPI control 401.

Furthermore, the receiving module 421 is further configured to receive the feedback messages which are reported by the SDN controller 200 via the network capacity control device 400 and indicate that the collection policies of the one or more network devices 300 are successfully executed.

After each of the one or more network devices 300 receives the traffic collection request transmitted by the SDN controller 200, a relevant traffic collection policy is deployed on this network device 300, and each of feedback messages indicating that the collection policy is successfully executed is sent to the SDN controller 200 after the deployment is completed. The SDN controller 200 collects the feedback messages which are sent by all of the network devices 300 and indicate that the collection policies are successfully executed, performs uniform processing, and then sends the uniformly-processed feedback messages indicating that the collection policies are successfully executed to the network capacity control device 400. The network capacity control device 400 sends the feedback messages to the receiving module 421 of the device for DPI control 401.

The traffic collection module, the receiving module, the generation module and the control policy sending module in the device for DPI control provided by the embodiments of the present disclosure can be realized by a processor in a network device, and can also be realized by a specific logic circuit, wherein the network device can be an independent server, and can also be a server used for realizing a network controller. In an embodiment, the processor can be a Central Processing Unit (CPU), a Micro-Processor Unit (MPU), a Digital Signal Processor (DSP), a Field Programmable Gate Array (FPGA) or the like.

In the embodiments of the present disclosure, if the method for DPI control is realized in a form of software function modules and is sold or used as an independent product, the product can also be stored in a readable storage medium. Based on this understanding, the technical solutions of the embodiments of the present disclosure can be substantially embodied in a form of a software product or parts contributing to the conventional art can be embodied in a form of a software product, and a computer software product is stored in a storage medium, which includes a plurality of instructions enabling a computer device which can be a personal computer, a server or a network device to execute all or part of the method according to each embodiment of the present disclosure. The storage medium includes various media capable of storing program codes, such as a USB disk, a mobile hard disk, a Read Only Memory (ROM), a disk or an optical disc. Thus, the embodiments of the present disclosure are not limited to a combination of any specific hardware and software.

Accordingly, an embodiment of the present disclosure further provides a readable storage medium. Executable instructions are stored in the readable storage medium and are used for executing the method for DPI control provided by each embodiment of the present disclosure.

The above is only the preferred embodiments of the present disclosure and is not intended to limit the scope of the present disclosure. The equivalent structure or equivalent flow implemented by using the description and drawings of the present disclosure or direct or indirect application to other relevant technical fields should fall within the protection scope of the present disclosure in the same way.

INDUSTRIAL APPLICABILITY

In the embodiments of the present disclosure, the traffic collection request is sent to the network controller according to the pre-set collection policy, wherein the traffic collection request is used for allowing the network controller to send the request for traffic collection to the one or more corresponding network devices; the traffic data collected by the one or more network devices are received; and the received traffic data from the one or more network devices are analyzed and processed to generate a network control policy corresponding to each of the network devices, and the network control policies are sent to the network controller to allow the network controller to send each of the network control policies to the corresponding network device. Thus, the network controller interacts with each of the network devices, and therefore data collection and transmission of the control policy for one end-to-multiple ends are implemented.

What is claimed is:

1. A method for Deep Packet Inspection (DPI) control, comprising:
   sending, from a traffic collection module of a device for DPI control to a network controller via a northbound interface of the network controller, a traffic collection request according to a pre-set collection policy, wherein the traffic collection request is configured to instruct the network controller to send a request for traffic collection to more than one network device via a southbound interface of the network controller, wherein the traffic collection request is configured to specify more than one network device which needs the traffic collection request, and wherein the traffic collection request specifies traffic data to be collected via parameters that assign specific service flows from specific users and specific IP flows and traffic from specific ports that are to be collected;
   directly receiving at a receiving module of the device for DPI control and without using the network controller, the traffic data collected by the more than one network device according to the traffic collection request;
   analyzing and processing, by a generation module of the device for DPI control, the received traffic data from the more than one network device to generate each of network control policies corresponding to each of the network devices, wherein the network control policies describe application layer requirements;
   converting the network control policies into network control policies that are recognizable by the network controller;
   transmitting the converted network control policies to the network controller via the northbound interface of the network controller;
   sending, via the southbound interface of the network controller, each of the network control policies to a corresponding network device so as to implement the DPI control; and
   receiving feedback messages reported by the network controller, wherein the feedback messages are configured to indicate that the network devices have successfully executed the network control policies.

2. The method according to claim 1, wherein the step of sending, from a traffic collection module of a device for DPI control to the network controller via a northbound interface of the network controller, the traffic collection request according to the pre-set collection policy comprises:
   sending the traffic collection request to the network controller via a network capacity control device according to the pre-set collection policy, wherein the traffic collection request is configured to allow the network controller to send the request for traffic collection to the more than one network device.

3. The method according to claim 2, wherein the step of transmitting the converted network control policies to the network controller comprises:
   sending the network control policies to the network controller via the network capacity control device to allow the network controller to send each of the network control policies to the corresponding network device.

4. The method according to claim 2, before directly receiving, at the receiving module of the device for DPI control and without using the network controller, the traffic data collected by the more than one network device, further comprising:
   receiving second feedback messages reported by the network controller via the network capacity control device, wherein the second feedback messages indicate that collection policies of the more than one network device are successfully executed.

5. The method according to claim 1, before directly receiving, at a receiving module of the device for DPI control and without using the network controller the traffic data collected by the more than one network device, further comprising:
   receiving second feedback messages reported by the network controller, wherein the second feedback messages indicate that collection policies of the more than one network device are successfully executed.

6. A device for Deep Packet Inspection (DPI) control, comprising:
   an electronic computer processor; and
   a non-transitory memory storing executable instructions which, when executed, cause the electronic computer processor to:
      send, from a traffic collection module of a device for DPI control to a network controller via a northbound interface of the network controller, a traffic collection request according to a pre-set collection policy, the traffic collection request being configured to instruct the network controller to send a request for traffic collection to more than one network device via a southbound interface of the network controller, and the traffic collection request being configured to specify more than one network device which needs the traffic collection request, and the traffic collection request specifying traffic data to be collected via parameters that assign specific service flows from specific users and specific IP flows and traffic from specific ports that are to be collected;

directly receive at a receiving module of the device for DPI control and without using the network controller, the traffic data collected by the more than one network device according to the traffic collection request;

analyze and process, by a generation module of the device for DPI control, the received traffic data from the more than one network device to generate each of network control policies corresponding to each of the network devices, the network control policies describing application layer requirements;

convert the network control policies into network control policies that are recognizable by the network controller;

transmit the converted network control policies to the network controller via the northbound interface of the network controller;

send, via the southbound interface of the network controller, each of the network control policies to a corresponding network device so as to implement the DPI control; and receive feedback messages reported by the network controller, the feedback messages being configured to indicate that the network devices have successfully executed the network control policies.

7. The device according to claim 6, wherein the executable instructions, when executed, further cause the electronic computer processor to send the traffic collection request to the network controller via a network capacity control device according to the pre-set collection policy, the traffic collection request being configured to allow the network controller to send the request for traffic collection to the more than one network device.

8. The device according to claim 7, wherein the executable instructions, when executed, further cause the electronic computer processor to send the network control policies to the network controller via the network capacity control device to allow the network controller to send each of the network control policies to the corresponding network device.

9. The device according to claim 7, wherein the executable instructions, when executed, further cause the electronic computer processor to receive second feedback messages reported by the network controller via the network capacity control device, wherein the second feedback messages indicate that collection policies of the more than one network device are successfully executed.

10. The device according to claim 6, wherein the executable instructions, when executed, further cause the electronic computer processor to receive second feedback messages reported by the network controller, wherein the second feedback messages indicate that collection policies of the more than one network device are successfully executed.

11. A non-transitory computer-readable storage medium storing executable instructions which, when executed on a processor, cause the processor to execute a method for Deep Packet Inspection (DPI) control comprising:

sending, from a traffic collection module of a device for DPI control to a network controller via a northbound interface of the network controller, a traffic collection request according to a pre-set collection policy, wherein the traffic collection request is configured to instruct the network controller to send a request for traffic collection to more than one network device via a southbound interface of the network controller, and wherein the traffic collection request is configured to specify more than one network device which needs the traffic collection request, and wherein the traffic collection request specifies traffic data to be collected via parameters that assign specific service flows from specific users and specific IP flows and traffic from specific ports that are to be collected;

directly receiving at a receiving module of the device for DPI control and without using the network controller the traffic data collected by the more than one network device according to the traffic collection request;

analyzing and processing, by a generation module of the device for DPI control, the received traffic data from the more than one network device to generate each of network control policies corresponding to each of the network devices wherein the network control policies describe application layer requirements;

converting the network control policies into network control policies that are recognizable by the network controller;

transmitting the converted network control policies to the network controller via the northbound interface of the network controller;

sending, via the southbound interface of the network controller, each of the network control policies to a corresponding network device so as to implement the DPI control; and receiving feedback messages reported by the network controller, wherein the feedback messages are configured to indicate that the network devices have successfully executed the network control policies.

* * * * *